US010831692B2

(12) United States Patent
Van Der Zande et al.

(10) Patent No.: US 10,831,692 B2
(45) Date of Patent: *Nov. 10, 2020

(54) BUS ADDRESS ASSIGNMENT (71) Applicant: SIGNIFY HOLDING B.V., Eindhoven (NL)

(72) Inventors: Alexander Abraham Cornelius Van Der Zande, Eindhoven (NL); Jurgen Mario Vangeel, Eindhoven (NL); John Edgar Held, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/234,524

(22) Filed: Dec. 27, 2018

(65) Prior Publication Data

US 2019/0129878 A1 May 2, 2019

Related U.S. Application Data

(62) Division of application No. 15/121,700, filed as application No. PCT/EP2015/052569 on Feb. 9, 2015, now Pat. No. 10,185,689.

(30) Foreign Application Priority Data

Feb. 28, 2014 (EP) .................................... 14157280

(51) Int. Cl.
*G06F 13/40* (2006.01)
*G06F 13/42* (2006.01)
*H04L 29/12* (2006.01)

(52) U.S. Cl.
CPC ........ *G06F 13/404* (2013.01); *G06F 13/4282* (2013.01); *G06F 13/4291* (2013.01); *H04L 61/2038* (2013.01); *H04L 61/2053* (2013.01)

(58) Field of Classification Search
None
See application file for complete search history.

(56) References Cited

U.S. PATENT DOCUMENTS 5,787,306 A 7/1998 Michael
6,725,281 B1 * 4/2004 Zintel ................. H04L 12/2803
709/217
(Continued)

FOREIGN PATENT DOCUMENTS

CN 103106142 A 5/2013
DE 102010005104 B3 7/2011
(Continued)

*Primary Examiner* — Henry Tsai
*Assistant Examiner* — Aurangzeb Hassan
(74) *Attorney, Agent, or Firm* — Daniel J. Piotrowski (57) ABSTRACT

A plurality of devices communicate over a bus, the devices comprising a plurality of controller devices and a plurality of second devices. Each of the controller devices is responsible for assigning one or more of the addresses including at least the address of each of a respective one or more of the second devices. A controller device comprises address allocation logic configured to assign an address to each of that controller device's respective one or more second devices, by: searching for a currently unassigned address to assign to each of the respective one or more second devices, and if an unassigned address for one of those one or more second devices cannot be found, to issue a request to at least one other of the controller devices requesting that the other controller device changes one of the one or more addresses which that other controller device is responsible for assigning.

12 Claims, 4 Drawing Sheets

(56) References Cited

U.S. PATENT DOCUMENTS

| | | | |
|---|---|---|---|
| 6,745,270 | B1 | 6/2004 | Barenys et al. |
| 7,827,383 | B2 * | 11/2010 | Spracklen ............ G06F 12/1036 710/4 |
| 10,324,858 | B2 * | 6/2019 | Mathewson ........ G06F 12/1036 |
| 2007/0220167 | A1 | 9/2007 | Golding et al. |
| 2007/0250648 | A1 | 10/2007 | Picard et al. |
| 2009/0150620 | A1 * | 6/2009 | Paver .................... G06F 9/3879 711/146 |
| 2009/0193197 | A1 * | 7/2009 | Stevens ............... G06F 12/0804 711/141 |
| 2012/0072626 | A1 | 3/2012 | Scott et al. |
| 2012/0233399 | A1 | 9/2012 | Kurokawa |
| 2013/0311738 | A1 * | 11/2013 | Jiang ................... G06F 12/1466 711/163 |
| 2015/0227482 | A1 * | 8/2015 | Winter ................ G06F 13/4234 710/117 |
| 2017/0109281 | A1 * | 4/2017 | Weissmann ......... G06F 12/1027 |
| 2017/0286122 | A1 * | 10/2017 | Wu ....................... G06F 9/3877 |

FOREIGN PATENT DOCUMENTS

| | | |
|---|---|---|
| JP | 098828 A | 1/1997 |
| WO | 2012171582 A1 | 12/2012 |
| WO | 2013171881 A1 | 11/2013 |

\* cited by examiner

BUS ADDRESS ASSIGNMENT

TECHNICAL FIELD

The present disclosure concerns the assignment of unique bus addresses to devices connected to a bus, such as an I²C bus or any other type of bus.

BACKGROUND

I²C is a type of serial computer bus that can be used to attach low-speed peripherals to a motherboard, embedded system, cell phone, or other electronic device. In the context of a bus, a master is a device which can initiate transactions over the bus and a slave is a device which is connected to the bus but cannot initiate any transactions over it (and hence only communicates over the bus in response to a master). Typically I²C is used on a printed circuit board (PCB) to connect a limited number of slave devices to a single master microcontroller. Nonetheless, the I²C protocol does allow for multiple masters, i.e. multiple devices which can each initiate transactions over the bus (such as to provide an instruction or information to another device, or read information from another device). It is even possible that every participant is a master. Further, I²C can be used to connect components via cables, rather than just within one PCB.

An I²C-based system is typically built up using generic building blocks. In the case where I²C is used on a PCB to connect a limited number of "dumb" functional blocks to one "intelligent" (micro) controller, the system setup and availability of addresses is known beforehand.

SUMMARY

It would be desirable to make bus systems such as I²C more suitable for a wider range of applications, such as lighting control systems. For instance it may be desired to provide a plurality of modules such as intelligent luminaires, where each module comprises a controller device and one or more second devices all individually connected to the same bus. E.g. in the case of intelligent luminaires, each luminaire may comprise an intelligent controller and one or more dumb devices such as a memory (e.g. EEPROM), lamp, and/or sensor; with each intelligent and dumb device in each module all being individually connected to the same bus, e.g. an I²C bus.

Using a bus like an I²C bus as a communication interface to connect different modules together (e.g. to build a system such as a lighting control system) may offer advantages but also challenges. An advantage is that it allows greater flexibility, e.g. with "intelligent" (micro) controllers and many standard "dumb" functional devices like memory, input, output, sensing and many others being available on the market. This allows fast and cost effective development. A challenge however is using the system in an environment that is outside the typical application area of I²C and still reaching acceptable performance. The performance in data throughput and robustness is determined by the system setup and the environment it is used in. For instance, it would be desirable to provide an I²C address assignment process allowing multiple (similar) modules to be interconnected while ensuring that all I²C candidates have a unique address and that the module controller knows the addresses of all its own devices.

Scaling up the system to multiple "intelligent" controllers connected together on the same bus greatly increases the problem of guaranteeing every participant gets a unique I²C address. Since a given type of "dumb" functional block can be used in a system more than once, a fixed addressing scheme as normally used in I²C systems will not always work. At the design stage it may not necessarily be known which generic building blocks are going to be combined in a system, and therefore it may not be possible to select suitable addresses for the building blocks at the design stage. For example if an intelligent controller with an I²C EEPROM is using the same I²C bus as another intelligent controller with an I²C EEPROM, it would be desirable to provide an "intelligent" addressing solution that provides different I²C addresses for the two controllers and for their respective EEPROMS. Similar considerations may also arise in other applications and/or other types of bus.

The present disclosure provides a system in which multiple controllers are connected to a bus, and each controller is responsible for assigning the addresses of one or more respective second devices that are also connected to the bus. For example each controller device and its respective second device(s) may form part of the same respective module, e.g. the same luminaire. For the purpose of the present application, an "intelligent" device is a controller device which is responsible for assigning one or more addresses, and a "dumb" device is a second device which has its address assigned by a controller device (e.g. because it is incapable of assigning its own address or indeed any addresses). In embodiments the intelligent controllers may also have other responsibility, e.g. each controller may be responsible for controlling its respective second device(s). The intelligent controllers may be master devices meaning a device able to initiate transactions over the bus, while the dumb second devices may be slave devices meaning devices that are not capable of initiating transactions over the bus (though intelligent and dumb need not be synonymous with master and slave in all possible embodiments).

One particular issue in such an arrangement is that there may be limited options for picking addresses, with only some addresses within the bus's address range being suitable for some of the devices while only certain other addresses may be suitable for other devices. For example, each of the second devices may only be able to be assigned an address from amongst a limited, predetermined range of possible addresses consisting of fewer addresses than the bus's address range, e.g. restricted to a limited factory address range; or certain addresses may be unsuitable for other reasons, e.g. due to design considerations by the designer. This means that when a new device or module is added or comes to have its address assigned, it may be necessary to revisit earlier choices.

According to the present disclosure, an intelligent controller device tries to find a free address to assign to its dumb second device (which can't allocate its own address), but if there are no free addresses then the controller asks one or more of the other intelligent devices whether they can change one of their addresses (either their own or one of the dumb devices they are responsible for).

Hence according to one aspect disclosed herein, there is provided a controller device comprising a bus interface and address allocation logic. The bus interface enables communication over a bus based on addresses assigned to a plurality of devices which communicate over that bus. These devices comprise a plurality of second devices, and a plurality of controller devices including said controller device. Each of the controller devices is responsible for assigning one or more of the bus addresses, including at least the address(es) of a respective one or more of the second devices. The address allocation logic is configured to assign an address to each of said controller device's respective one or more second devices. It does this by searching for a currently unassigned address to assign to each of its respective one or more second devices, and if an unassigned address for one of the one or more respective second devices cannot be found, issuing a request to at least one other of said controller devices (e.g. over the bus) requesting that the other controller device changes one of the one or more addresses which that other controller device is responsible for assigning.

In embodiments, said request comprises a request to change the address of one of the other device's respective one or more second devices. In embodiments, each of the controller devices may also be responsible for assigning its own address, and said request may comprise a request to change the address of the other device or the address of one of the other device's respective one or more second devices.

In further embodiments, the controller device may be connected to each of its one or more respective second devices by a separate connection for assigning their address (es), i.e. a connection separate from said bus. Hence in embodiments the controller device may comprise a second interface for assigning the address of said controller devices' respective one or more second devices via a separate connection separate from said bus. In embodiments this may be provided for each of the controller devices and their respective second devices. This additional connection may be a dedicated or point-to-point connection between the controller and its respective second (e.g. slave) device, with an individual connection for each second device. In embodiments, each controller may be connected by an individual dedicated or point-to-point connection to each of its one or more own respective second (e.g. slave) device(s) (as opposed to, say, equal devices being connected in a daisy chain and passing addresses down the chain).

To implement the request mechanism, in embodiments said request may comprise a proposed address that said controller device proposes to use for one of its respective one or more second devices, thereby triggering the other controller device, if the proposed address has already been assigned by that other controller device, to determine whether it can free the proposed address by means of said change.

The controller device may also comprise a reciprocal mechanism allowing the other device(s) to make similar requests of it. Hence in embodiments, the address allocation logic may be operable to receive a request from at least one other of the controller devices comprising a proposed address that the other controller device proposes to use for one of its respective one or more second devices; and the address allocation logic may be configured, in response, if the proposed address has already been assigned by said controller device, to determine whether it can free the proposed address by changing one of the one or more addresses that said controller device is responsible for assigning.

In further embodiments, the address allocation logic may be configured to perform said search for a currently unassigned address by: sending a message to a candidate address over the bus, and determining that the candidate address is already assigned if an acknowledgment is received back from the candidate address in response, and determining that the candidate address is currently unassigned if an acknowledgement is not received back from the candidate address in response.

According to another aspect disclosed herein, there may be provided a system comprising: a bus; and a plurality of devices connected to the bus and each requiring an address for communicating over the bus, the plurality of devices being arranged into groups with each group comprising a respective controller device and a respective one or more second devices. For example each group may form part of a respective module, e.g. a respective luminaire. Each of the controller devices is responsible for assigning one or more of said addresses including at least the address of each of its respective one or more second devices. Further, each of the controller devices is configured to perform said assignment by: searching for a currently unassigned address to assign to each of its respective one or more second devices, and if an unassigned address for one of the one or more respective second devices cannot be found, to issue a request to at least one other of said controller devices requesting that the other controller device changes one of the one or more addresses which that other controller device is responsible for assigning.

In embodiments, any one, some or all of the controller devices of the system may be configured in accordance with any of the features of any controller device disclosed herein; and any one, some or all of the second devices of the system may be configured in accordance with any of the features of any second device disclosed herein.

According to another aspect, the present disclosure provides a computer-program product embodied on a computer-readable medium and configured so as when executed on a controller device to perform operations in accordance with any controller device disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EXAMPLE EMBODIMENTS

The following embodiments provide $I^2C$ controller which is arranged to be connected to an $I^2C$ bus and, separately, to an $I^2C$ slave which also is connected to the $I^2C$ bus. The $I^2C$ controller is configured to determine that all other $I^2C$ controllers connected to the $I^2C$ bus have had respective addresses assigned to them, and then to send acknowledgement requests, one at a time, to a list of $I^2C$ addresses. As soon as one of the acknowledgement requests does not elicit an acknowledgment, the $I^2C$ controller stops sending acknowledgement requests and then assigns to the $I^2C$ slave the address to which said one of the acknowledgement requests was sent. If no such address can be found, the $I^2C$ controller sends a request to one or more other controllers to ask if they can change any of the addresses they are responsible for, thus freeing up the address for use by the requesting controller to assign to one of its slave. This takes into account that while the bus may have a certain overall address range available in principle, only some of those addresses may be suitable for certain devices, while other addresses may be suitable for others. For example, standard "off-the-shelf" functional devices may only have a fixed factory address range from which their addresses can be selected.

Figure 1:
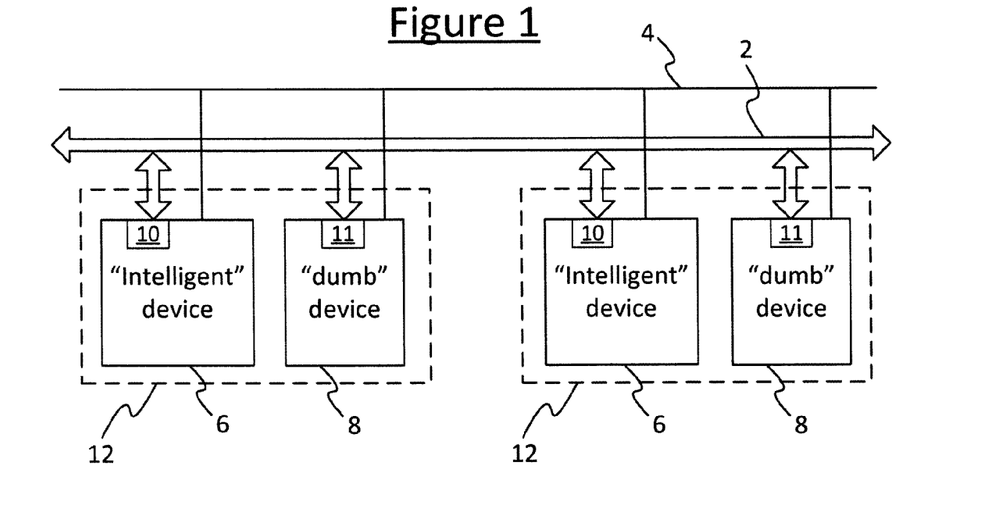
FIG. 1 is a schematic block diagram of a bus and connected devices.

FIG. 1 illustrates a system comprising a communications bus 2 and a plurality of devices 6, 8 connected to the bus 2, such that communications between devices 6, 8 can be conducted over the bus 2 according to a suitable bus protocol. In embodiments the bus 2 is an $I^2C$ bus over which communications are conducted according to the $I^2C$ protocol. A device 6, 8 that is connected to the bus 2 and arranged to transmit and/or receive messages over the bus 2 according to the relevant bus protocol may be referred to as a participant of that bus. In the present case, the bus participants comprise a plurality of "intelligent" devices 6 and one or more "dumb" devices 8.

An "intelligent" device as used in the following refers to a controller device which includes an instance of the address allocation logic mechanism in accordance with embodiments disclosed herein, and which preferably comprises a microcontroller or other processor arranged to execute software for controlling one or more other devices 6, 8 connected to the bus 2. Hence each intelligent device is preferably a master, i.e. able to initiate transactions over the bus 2 (to control slaves and/or to communicate with other masters). A "dumb" device on the other hand refers to a device not having address allocation logic in accordance with embodiments disclosed herein, and which requires its address to be assigned to it by an associated (intelligent) controller device 6 which is responsible for it. Each dumb device may be a slave device (i.e. cannot initiate bus transactions), or a master device but one only configured according to standard or previously known bus techniques and not itself able to assign addresses. For example a "dumb" device may be a standard ("off-the shelf") $I^2C$ device. The dumb device may be implemented in dedicated hardware, or in a microcontroller programmed only with limited functionality. In embodiments, one, some or all of the dumb devices 8 may be slaves. Alternatively every bus participant may be a master device. In the following examples, each intelligent device 6 may be interchangeably described as a master and each dumb device 8 may be interchangeably described as a slave. However, it will be appreciated this is not necessarily the case in all possible embodiments.

Each controller device 6 comprises bus communication logic 10, configured to communicate with other devices 6, 8 over the bus 2 in accordance with the master status of its respective device. A master device 6 can autonomously access the bus 2, i.e. can issue a message onto the bus without first being polled or receiving a request from another device connected to the bus 2. I.e. as mentioned, a master 6 is a device that can initiate a transaction over the bus. The slaves 8 on the other hand can only receive messages and respond to received messages. A slave cannot initiate a transaction itself. Each slave 8 comprises (limited) bus communication logic 11 for receiving and responding to messages over the bus 2 according to the bus protocol.

As well as communicating over the bus 2, each of the devices 6, 8 also has some other functionality providing the "end use" or purpose of the device. For instance, in a lighting system, some of the devices may each comprise a respective lamp or light source arranged to illuminate a space (e.g. an indoor space such as a room, corridor, hall, theatre, shop floor, etc.; or an outdoor space such as a garden, park, stadium, etc.; or any other space such as the interior of a vehicle). One or some of the devices may provide other kinds of functionality, such as a presence sensor. A presence sensor is a device which detects presence of a person in a space, e.g. by detecting motion and/or heat. Example technologies by which a presence sensor may operate include passive infrared (PIR) or ultrasound. Other example devices could include a memory device such as an EEPROM, and/or a controller for controlling one or more lamps and/or sensors via the bus 2.

Each master device 6 may request data from another device 6, 8 on the bus 2, e.g. to request status information. Each master device may also send data to another module 6, 8 on the bus 2, e.g. to control it to provide some functionality, or to store information there.

As shown in FIG. 1, the devices 6, 8 are arranged into groups 12 with each group comprising one or more respective slave devices 8 and a respective master device 6 acting as a controller for that group 12. For example, each group 12 may be the devices 6, 8 of a respective module of a system of intelligent modules connected together over the bus 2. E.g. each module 12 may be a respective intelligent luminaire of an intelligent lighting system. Within each given module or group 12, the master controller device 6 is responsible for the respective one or more slave devices 8 in its respective module or group 12. In accordance with the present disclosure, this means at least that the master controller device 6 is arranged to assign a bus address to each of its one or more respective slave devices 8, as will be discussed in more detail shortly. Preferably, this also means the master controller device 6 is arranged to control or exploit the functionality of its one or more respective slave devices 8 via the bus 2. Note that each individual device 6, 8 (not just each module 12) is individually connected to the bus 2 meaning that any master 6 is potentially able to communicate with any other device 6, 8 (depending on whether they are programmed or otherwise deployed to do so in any given application); but nonetheless, each master 6 is at least primarily responsible for controlling the respective slaves 8 of its respective group or module 12.

In embodiments, each device 6, 8 may also be connected to a separate power supply line 4 such as a power-over-Ethernet connection, which powers the front-end functionality of the device 6, 8. For example in the case of luminaire, this power supply 4 may be connected to the driver of the luminaire's light source(s). Alternatively some or all of the devices 6, 8 could each be provided with its own individual power supply, or a power supply could be incorporated into the communication bus 2.

Figure 2:
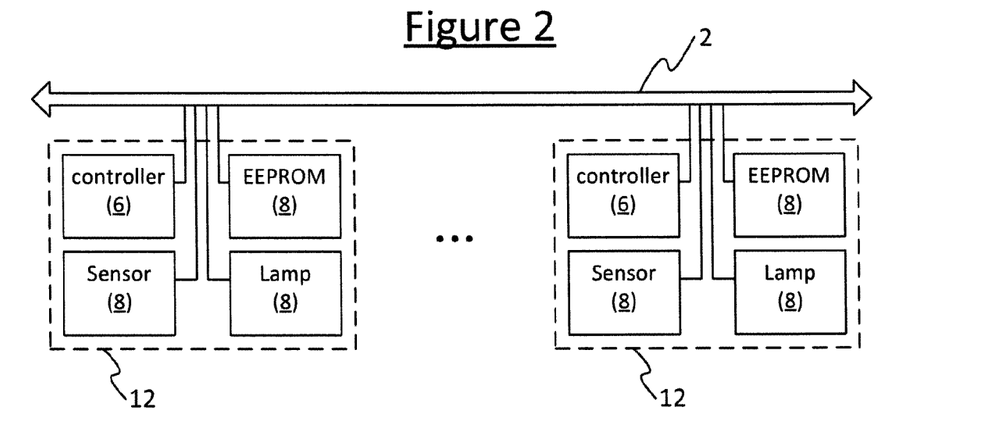
FIG. 2 is a schematic block diagram of a lighting system.

An example application of the present disclosure is illustrated in FIG. 2. Here, the system comprises a plurality of intelligent luminaires 12, each comprising a plurality of devices 6, 8 each connected to the bus 2. For example the devices 6, 8 of each luminaire may be comprised within the same housing. In the example shown, each luminaire 12 comprises a lamp or light source, a presence sensor, a memory such as an EEPROM, and a controller. Each of the light sources, sensors and memories may be implemented as a slave or dumb device 8, and each of the controllers may be implemented as an intelligent master device 6. Each master controller device 6 is primarily responsible for controlling the light source of its own respective luminaire 12 and taking sensor readings from the sensor of its own luminaire 12, though it may also be possible for a controller 6 to initiate transactions with the slave devices 8 of other luminaires 12 over the bus 2. Further, the controllers 6 can communicate with other controllers 6 over the bus 2, for example to exchange information for coordinating the operation of the luminaires 12, e.g. to turn on or dim up only those luminaires 12 in a region where a user is determined to be present based on the sensor readings from the presence sensors, and to turn off or dim down other luminaires 12 in order to save power consumption. It will be appreciated this is only one example, and various other arrangements are possible for implementing a lighting system or other kind of system.

In embodiments of this or other applications, the bus 2 may comprise one or more lengths of cable between devices 6, 8 or modules 12 on different circuit boards and/or housed in different units, which may be separated by multiple meters of the cable. For instance in a context such as a lighting system, the bus 2 may comprise multiple meters of cable connecting between the various intelligent luminaires 6.

Figure 3:
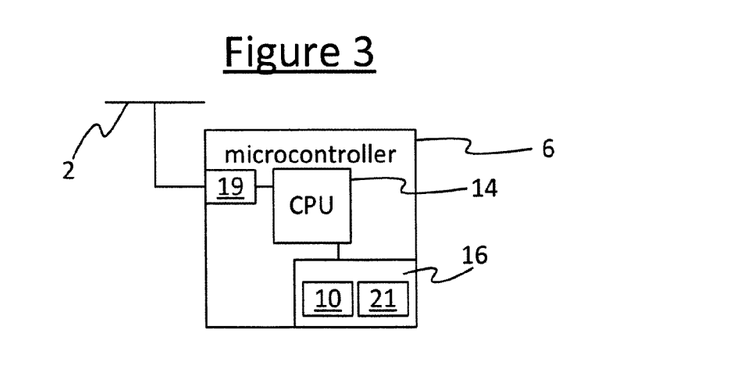
FIG. 3 is a schematic block diagram of a controller device.

FIG. 3 shows the details of an individual master device 6. In embodiments each of the master devices 6 participating on the bus 2 may be configured as in FIG. 3. The master device 6 comprises a port 19 for connecting to the bus 2. Further, the master device 6 comprises bus communication logic 10 and address allocation logic 21. The bus communication logic 10 is configured to communicate over the bus 2 according to the relevant bus protocol, e.g. I$^2$C. The address allocation logic 21 is configured to be able to assign addresses to itself and its respective slave device(s) 8 as will be discussed in more detail shortly.

In an exemplary implementation, the master device 6 may comprise a processor 14 comprising one or more processing units or cores, and a memory 16 comprising one or more storage units or storage media. In embodiments the processor 14 and memory 16 may take the form of an embedded microcontroller, e.g. embedded in a luminaire 12, though in general no limit is placed on the size or type of the processor or memory. In such an implementation, some or all of the bus communication logic 10 and/or address allocation logic 21 may be implemented in the form of code stored on the memory 16 and arranged for execution on the processor 14 of the respective master module 6. For example the memory 16 may comprise a RAM into which code from a separate memory module (e.g. EEPROM) is fetched over the bus 2, and/or embedded non-volatile storage such as a boot ROM in which code is pre-stored. Note therefore that "logic" or "mechanism" does not imply an implementation in dedicated hardware circuitry. Nonetheless, in alternative implementations it is possible that some or all of the bus communication logic 10 and/or reset mechanism 20 could be implemented in dedicated hardware circuitry, or a configurable or reconfigurable circuitry such as a PGA or FPGA. In general logic or mechanism can refer to a soft or hard implementation.

Together the allocation logic 21 on the different master devices 6 form a distributed address assignment system in accordance with embodiments of the present disclosure, examples of which will be discussed in more detail below with reference to FIGS. 4 to 7.

The following discloses an intelligent, automatic addressing mechanism guaranteeing the uniqueness of the I$^2$C addresses of each device 6, 8 (being intelligent or not) within the system, enabling interaction with each separate device individually. This automatic addressing mechanism takes into account that dumb functional devices 8 may be connected to the I$^2$C bus, and will avoid typical addresses such devices might claim (therefore still guaranteeing the uniqueness of all addresses when a new slave device 8 is added to the I$^2$C bus 2).

Once a dumb "off-the-shelf" I$^2$C device 8 is used by one of the modules 12 connected to the bus 2, another instance of the same device 8 or module 12 would lead to address conflict on the bus 2, not allowing the separate off-the-shelf devices 8 to be addressed separately. Since at design time the build-up of the entire system may be unknown, the addressing implications need to be taken care of during run time. The following describes an efficient way of deciding how to allocate addresses to additional devices, and a means to set the selected addresses.

Note: the additional dumb or slave devices 8 have no means to change their own address in case of address conflict.

In embodiments the solution has the following features.
a) Each intelligent module 6 comprises a (micro) controller with a unique address obtained using an intelligent addressing scheme (phase i).
b) Each slave device 8 is coupled to one of the (micro) controllers.
c) Each slave device 8 has an external input for setting a specific address from amongst a factory address range.
d) The assigned address for each slave device 8 is made unique such that there is always one (and only one) device 6, 8 having a specific address (multiple devices with the same address may interfere with each other and may lead to unwanted behavior). Addresses can be made unique using a "check and claim" addressing scheme (phase ii).

This way instances of the same dumb slave device 8 can be used on multiple intelligent modules 12 while maintaining unique individual addresses regardless of which modules 12 or devices 6, 8 are combined to realize the system.

Figure 4:
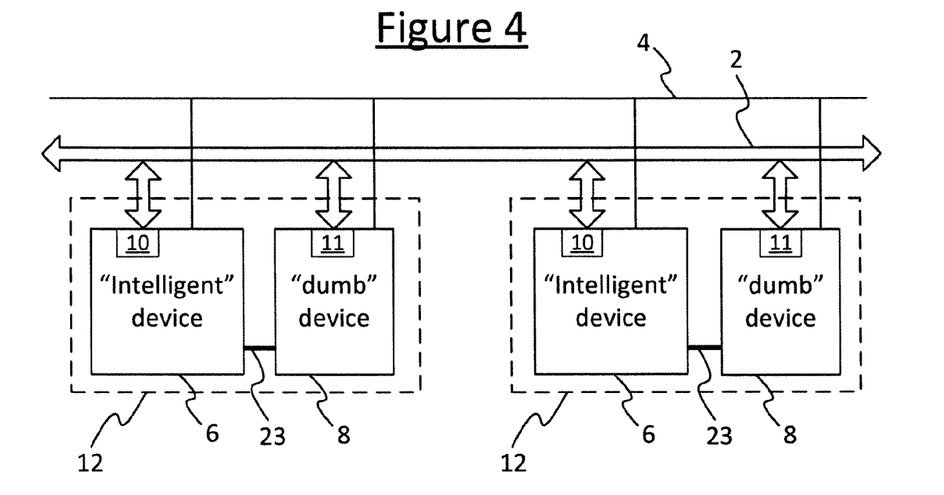
FIG. 4 is another schematic block diagram of a bus and connected devices.
Figure 5:
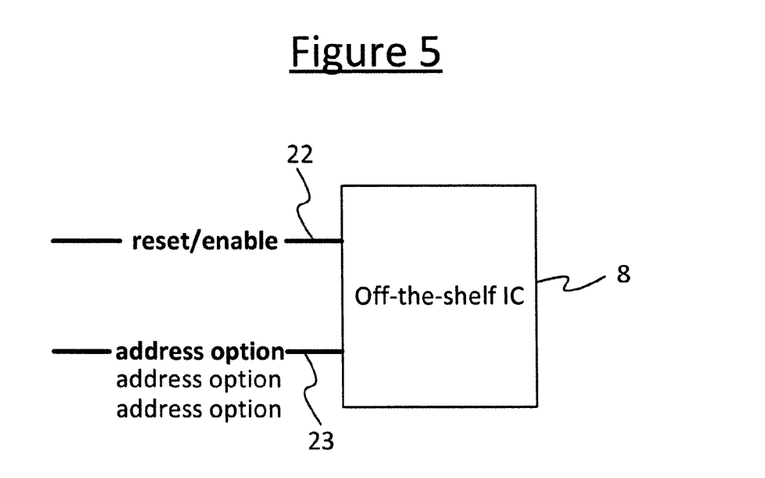
FIG. 5 is a schematic block diagram of a second device controlled by a controller device.

As illustrated in FIGS. 4 and 5, each dumb or slave device 8 is connected to the bus 2 using I$^2$C, but also and has an additional connection 23 to its respective intelligent (micro) controller 8 allowing the I$^2$C address of the slave device 8 to be chosen. This connection 23 is not via the bus 2, and preferably this takes the form of a dedicated hardware connection. For example the slave device 8 may take the form of an "off-the-shelf" integrated circuit (IC) and this additional connection 23 may comprise one or more external pins of the IC, and a wire connecting to the IC on which the controller 6 is formed. Such a pin may already be present in the dumb or slave device 8, originally intended by the manufacturer for setting the address during the design or commissioning phase of the system. However, in accordance with embodiments disclosed herein, the existence of the pin is exploited to allow the controller 6 to dynamically allocate the address of its slave 8 "in the field", including the possibility of dynamically changing an already-allocated address.

In embodiments other connections may also be provided between a controller 6 and its respective slave 8, such as a connection 22 from the controller 6 to a reset pin of its slave 8 allowing the controller 6 to reset the slave 8 via other means than the bus 2 (e.g. in case the bus is blocked by a slave device 6 stuck in an error state).

Figure 6:
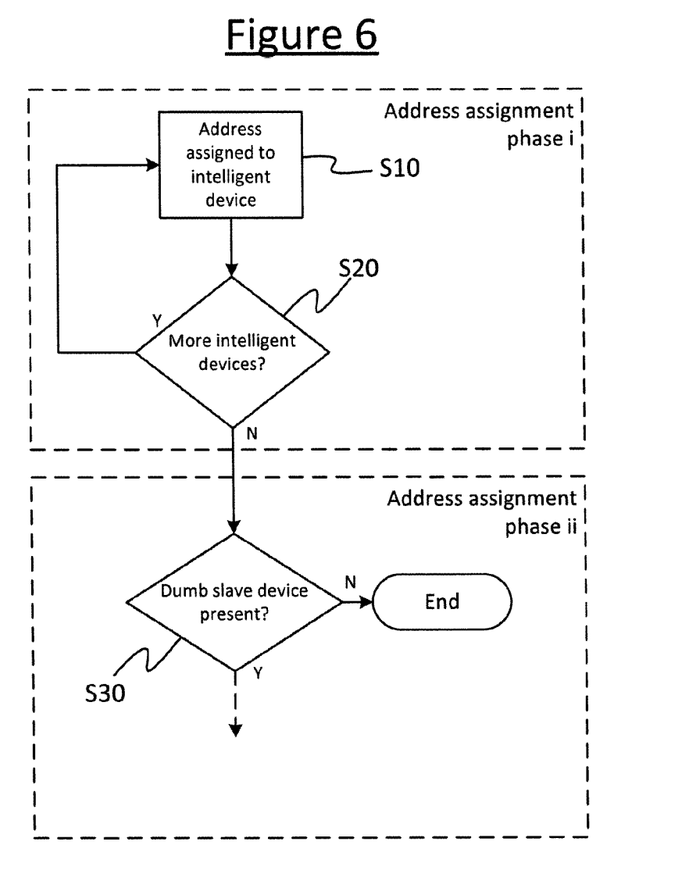
FIG. 6 is a schematic flow chart of an address assignment process.
Figure 7:
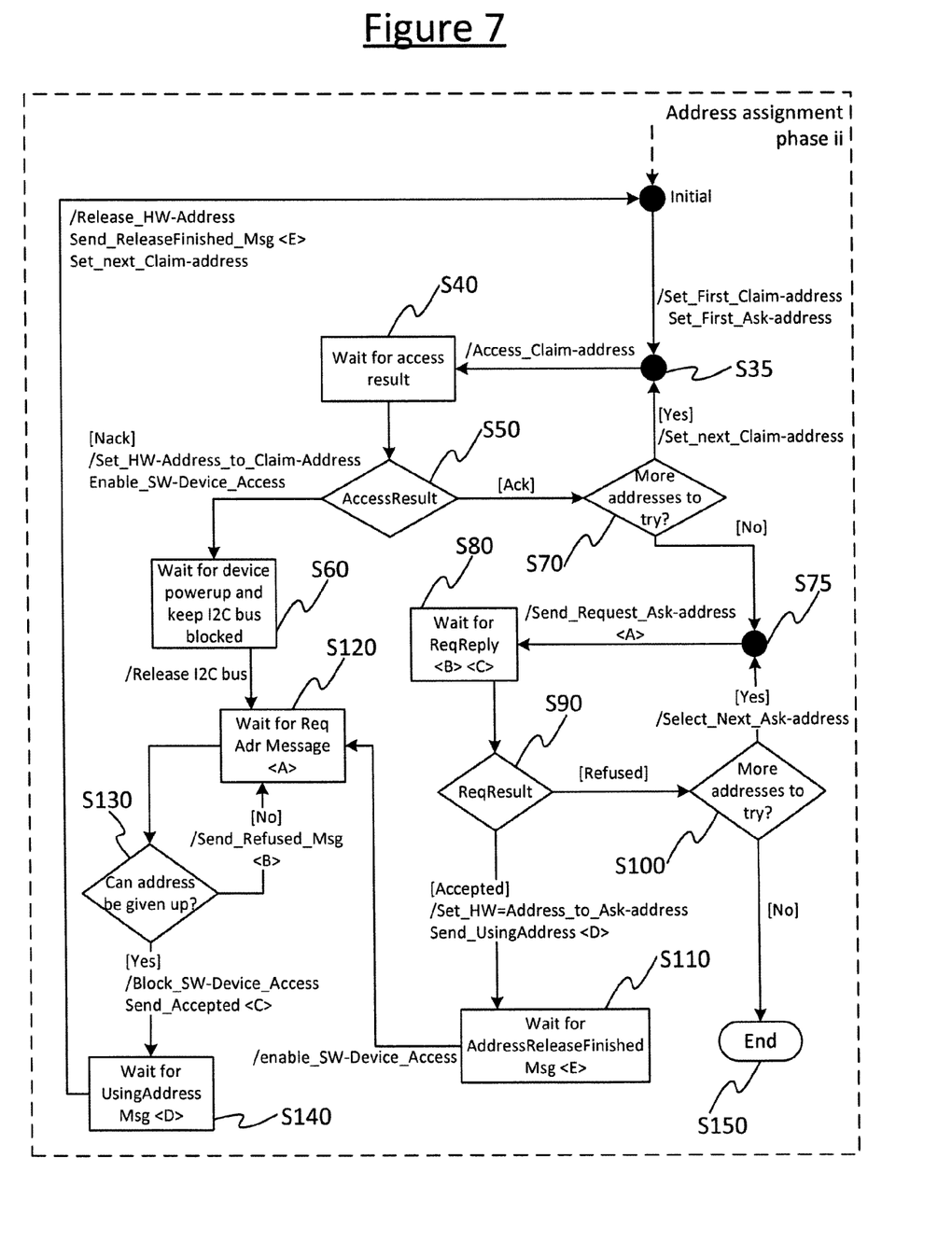
FIG. 7 is a schematic flow chart providing further details of an address assignment process.

FIGS. 6 and 7 illustrate a process of assigning bus addresses to the devices 6, 8 for communicating over the bus 2.

In a first phase (i) of the addressing scheme, each intelligent (micro) controller 6 will receive a unique I$^2$C address. These could be preconfigured at a design stage or commissioning stage, or the controllers 6 may be configured to assign their own addresses at run-time. In case of the controllers 6 assigning their own addresses, they may be configured to do this by negotiating with one another, or one controller 6 may take responsibility for assigning all the controller addresses in a centralized fashion, or the various controllers may each act autonomously starting at different (e.g. randomized) times with one controller 6 first claiming a first address, then the next controller 6 checking for a free address and claiming its own from amongst the remaining addresses and so forth. In the latter case, a controller device 6 can check for a free address for example by sending a message over the bus 2 to an address it intends to claim, and checking whether it receives an acknowledgement (if so the address is not free and it must try another).

However implemented, the overall process of phase (i) is represented conceptually by steps S10 and S20 in FIG. 6. At step S10 an address is assigned to the first controller 6, then at step S20 it is determined whether there are further controllers 6 and if so the method loops back to step S10 to assign the address of the next controller 6, and so forth. Once all controller addresses have been assigned, only then the method continues to step S30 where it is determined whether there are any slave devices 8 present and therefore requiring addresses to be assigned. This is phase (ii) of the address assignment process.

In phase (ii), the intelligent (micro) controller 6 determines a suitable address for each of the slaves 8 connected to it. FIG. 7 and the following description detail an exemplary procedure for one dumb I²C slave device 8 attached to an individual intelligent controller 6. The process for multiple such slave devices 8 attached to an individual intelligent controller 6 works the same way, with a separate instance of the addressing process per slave device 8. An instance of the process also runs individually at each controller 6 for each of its respective slave devices 8.

Step S35: the controller 6 chooses a possible address for the slave device 8, and sends out a message to that address over the bus 2; and at step S40 waits for the result.

Step S50: the controller 6 will verify whether this address is available (access_claim-address). If so, no acknowledgement (no <ACK>) will be received back over the bus from the address in question (which can be detected by waiting a timeout period or receiving an error back from the bus 2). The controller 6 then selects this address for slave device 8 currently under consideration (via separate connection 23). This comprises at step S60: keeping the bus 2 occupied (using for instance repeated start or clock stretching) and while the bus 2 is kept occupied configuring the address for slave device and resetting or enable the slave device 8 (e.g. via connection 22), then releasing bus 2. Once a respective address has been found for all slave devices 8 which the controller 6 is responsible for, it proceeds to step S120 (see below) where it enters the background process.

Step S70: if the address in question is not available on the other hand, this will be detected by an acknowledgment (<ACK>) being received back over the bus 2 from a device 6, 8 that already has this address. In this case, the controller 6 determines whether it has more possible address options (given any constraints on the addresses suitable for the slave device 8 in question, e.g. due to a limited factory address range). If so, it tries the next possible address for the slave device 8, repeating the iterative process of steps S40-S60; else it proceeds to step S80 where it asks one or more other controllers 6 if they can release one of their addresses which they have previously assigned (by re-assigning another address to the device 6, 8 that currently has it).

Step S75: the controller 6 chooses a possible address for the slave device (one that it has already determined is already assigned to another device 6, 8). It sends out a claim request message over the bus 2 to signal that it proposes to use this address (send_request_ask-address); and at step S80 waits for a reply (see steps S120 to S140 running in a receiving controller 6).

Step S90: the controller 6 assesses the response it receives back from the other controller 6.

Step S110: if the reply is to refuse the request ([refused]), the controller 6 determines whether it has more possible address options to try (given any constraints on the addresses suitable for the slave device 8 in question, e.g. due to a limited factory address range). If so it tries the next possible address for the slave device (repeat steps from step S75). Else it proceeds to step S150: no system solution is available given the currently chosen modules. The controller 6 waits for a change in the system.

Step S110: If the reply is to accept the request on the other hand ([accepted]), the controller 6 selects the address for its slave device 8. This comprises: configuring the address for the slave device 8 (via separate connection 23), resetting or enabling the slave device 8, and sending a reply message ([using]) to the other controller 6 confirming that it is accepting the offer.

Step S120: the controller 6 waits for a message from the other controller 6 ([release finished]). When received, the assignment and re-assignment has finished, and the controller 6 proceeds to the background process beginning at step S120.

The background process of steps 120 to 140 is the process a controller 6 runs continually once it has assigned addresses to all its own slave devices 8, and is now listening for requests from other controllers 6 that might ask it to release one of those addresses (by re-assigning).

Step S120: the controller 6 waits for a request message (send_request_ask) from another controller 6 (see step S75). The request message comprises a proposed address that the requesting device proposes to use for one of its own slaves 8, but is currently assigned by the present controller 6 (the controller receiving the request) to one of its slaves 8.

Step S130: the controller 6 checks to see whether more than one address is available for the slave device 8 currently using the proposed address mentioned in the request message. If not it merely returns a refusal message ([refused]) to the requesting controller 6 over the bus 2.

Step 140: if on the other hand one or more alternative addresses are available for the slave 8 in question, the controller returns and acceptance message ([accepted]) to the requesting controller 6. It then waits for a confirmation message ([using]) from the requesting device to confirm that it has accepted the offer and will indeed claim the address in question. When the confirmation message ([using]) is received, the slave device 8 of the present controller 6 is disabled, a release-finished message [release finished] is replied back to the requesting controller 6, and a new claim-cycle is started for the disabled slave device 8.

The process described above with reference to the example of FIG. 7 runs at each of the controller devices, with each controller 6 being arranged to assign the address of its own respective slave devices 8 and with the different controllers 6 negotiating between one another to accommodate the potential restrictions on each other's slave addresses. Thus the controllers assign the addresses of their respective slaves 8 in a distributed fashion not requiring any one centralized address allocation, allowing devices 6, 8 or modules 12 to be added "in the field" at run time.

Furthermore the process is dynamic, such that when a new slave device 8 is added it automatically has an address assigned to it by its respective controller 6, with another controller automatically re-assigning one of its addresses to accommodate the address restrictions of the new slave 8 if required. The process for assigning of the address to the new slave 8 (starting at step S30) may be triggered when a new slave device is added (step S30), or repeated check for new devices at intervals (e.g. periodically). Further, the background process (steps S110 to S140) continues to run in the background such that if a new device 6 is added at another controller 6 then addresses can be dynamically and automatically "reshuffled" as required.

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller device comprising:
a bus interface for communicating over a bus based on addresses assigned to a plurality of devices which communicate over the bus, the devices comprising a plurality of second devices and a plurality of controller devices including said controller device, wherein each of the controller devices is responsible for assigning one or more of the addresses including at least the address of each of a respective one or more of said second devices; and
address allocation logic configured to assign an address to each of said controller device's respective one or more second devices, by: searching for a currently unassigned address to assign to each of its respective one or more second devices, and if an unassigned address for one of the one or more respective second devices cannot be found, to issue a request to at least one other of said controller devices requesting that the other controller device changes one of the one or more addresses which that other controller device is responsible for assigning; and
wherein said request comprises a proposed address that said controller device proposes to use for one of its respective one or more second devices, thereby triggering the other controller device, if the proposed address has already been assigned by that other controller device, to determine whether it can free the proposed address by means of said change.

2. The controller of claim 1, wherein the request comprises a request to change the address of one of the other device's respective one or more second devices.

3. The controller device of claim 1, wherein each of the controller devices is also responsible for assigning its own address, said request comprising a request to change the address of the other device or the address of one of the other device's respective one or more second devices.

4. The controller device of claim 1, wherein each of the second devices cannot assign its own address.

5. The controller device of claim 4, wherein each of the second devices cannot assign any of the addresses.

6. The controller device of claim 1, wherein each of the controller devices is also responsible for controlling its respective one or more second devices via the bus.

7. The controller device of claim 1, comprising a second interface for assigning the address of said controller devices' respective one or more second devices via a separate connection separate from said bus.

8. The controller device of claim 1, wherein each of the controller devices is a master device which can initiate transactions over said bus, and each of the second devices is a slave device which cannot initiate transactions over said bus.

9. The controller of claim 1, wherein said request is issued over the bus.

10. The controller device of claim 1, wherein the bus has an address range and each of the second devices can be assigned only a limited, predetermined range of possible addresses consisting of fewer addresses than said address range.

11. A system including a controller device according to claim 1, the system comprising:
a bus; and
a plurality of devices connected to the bus and each requiring an address for communicating over the bus, the plurality of devices being arranged into groups with each group comprising a respective controller device and a respective one or more second devices;
wherein each of the controller devices is responsible for assigning one or more of said addresses including at least the address of each of its respective one or more second devices; and
wherein each of the controller devices is configured to perform said assignment by: searching for a currently unassigned address to assign to each of its respective one or more second devices, and if an unassigned address for one of the one or more respective second devices cannot be found, to issue a request to at least one other of said controller devices requesting that the other controller device changes one of the one or more addresses which that other controller device is responsible for assigning.

12. A non-transitory computer-readable medium storing one or more programs, including instructions, which when executed on a controller device causes the controller to perform operations of:
communicating over a bus based on a scheme of addresses assigned to a plurality of devices which communicate over the bus, the devices comprising a plurality of second devices and a plurality of controller devices including said controller device, wherein each of the controller devices is responsible for assigning one or more of the addresses including at least the address of each of a respective one or more of said second devices;
searching for a currently unassigned address to assign to each of said controller device's respective one or more second devices; and
if an unassigned address for one of the one or more respective second devices cannot be found, issuing a request to at least one other of said controller devices requesting that the other controller device changes one of the one or more addresses which that other controller device is responsible for assigning; and wherein said request comprises a proposed address that said controller device proposes to use for one of its respective one or more second devices, thereby triggering the other controller device, if the proposed address has already been assigned by that other controller device, to determine whether it can free the proposed address by means of said change.

\* \* \* \* \*